(12) United States Patent
Koutlev et al.

(10) Patent No.: US 6,671,634 B2
(45) Date of Patent: Dec. 30, 2003

(54) SYSTEM AND METHOD FOR RELIABILITY ASSESSMENT OF A POWER SYSTEM HAVING INTEGRATED MODULES

(75) Inventors: Krassimir G. Koutlev, Cary, NC (US); Richard E. Brown, Cary, NC (US); Le Tang, Cary, NC (US); Antonio C. Carvalho, Untersiggenthal (CH); Marta Lacorte, Untersiggenthal (CH); Hans-Erik Olovsson, Västerås (SE); Giuliano Guerra, Novi Ligure (IT); Andre Osterholt, Einhausen (DE); Carl-Ejnar Sölver, Ludvika (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/916,811

(22) Filed: Jul. 27, 2001

(65) Prior Publication Data
US 2003/0212514 A1 Nov. 13, 2003

Related U.S. Application Data

(60) Provisional application No. 60/258,618, filed on Dec. 27, 2000, and provisional application No. 60/258,333, filed on Dec. 27, 2000.

(51) Int. Cl.⁷ .................. G01R 21/00; G01R 21/06; G06F 19/00
(52) U.S. Cl. .............. 702/60; 702/58; 324/537
(58) Field of Search .................. 702/57, 58, 60, 702/64, 65, 117, 176, 177, 182, 184, 185, 189, 190; 714/1, 2, 47, 704; 324/537; 700/286; 703/18; 705/28, 29, 63, 412

(56) References Cited

U.S. PATENT DOCUMENTS

| | | | | |
|---|---|---|---|---|
| 5,107,497 A | * | 4/1992 | Lirov et al. | 714/26 |
| 5,699,403 A | * | 12/1997 | Ronnen | 379/15.04 |
| 5,798,939 A | * | 8/1998 | Ochoa et al. | 700/286 |
| 6,041,287 A | * | 3/2000 | Dister et al. | 702/182 |
| 6,167,352 A | * | 12/2000 | Kanevsky et al. | 702/81 |
| 6,321,187 B1 | * | 11/2001 | Squier et al. | 703/18 |
| 6,330,935 B1 | * | 12/2001 | Systermans | 187/391 |

OTHER PUBLICATIONS

Brown, Richard E., "Probabilistic Reliability and Risk Assessment of Electric Power Distribution Systems," DistribuTECH Conference, San Diego, CA, Feb. 2001.
Brown, Richard E., et al., "Modeling the Impact of Substations on Distribution Reliability," IEEE Transactions On Power Systems, vol. 14, No. 1, Feb. 1999, pp. 349–354.
Carvalho, Antonio, et al., "Functional Specification As Driver For Technical/Economical Optimisation of Substation," Presentation at CIGRE 2000 Session, Paris, France.
Beshir, M.J., et al., "Comparison of Monte Carlo Simulation and State Enumeration Based Adequacy Assessment Programs: CREAM and COMREL," IEEE, 1996, pp. 438–444.
van Casteren, Jasper F.L., et al., "Reliability Assessment in Electrical Power Systems: The Weibull–Markov Stochastic Model," IEEE Transactions on Industry Applications, vol. 36, No. 3, May/Jun. 2000, pp. 911–915.

* cited by examiner

Primary Examiner—Marc S. Hoff
Assistant Examiner—Mary Catherine Baran
(74) Attorney, Agent, or Firm—Woodcock Washburn LLP (57) ABSTRACT

Reliability assessment of a power system having an integrated component is provided by retrieving individual component failure rates associated with individual components of the integrated component. A failure time is modeled based on the individual component failure rates associated with individual components of the integrated component. Individual component maintenance times are retrieved associated with individual components of the integrated component. A maintenance time is modeled based on the individual component maintenance times associated with individual components of the integrated component. A reliability assessment is determined based on the interconnectivity of components of the power system, the modeled maintenance times, and the modeled failure times.

54 Claims, 5 Drawing Sheets

SYSTEM AND METHOD FOR RELIABILITY ASSESSMENT OF A POWER SYSTEM HAVING INTEGRATED MODULES

CROSS REFERENCE TO RELATED APPLICATIONS

This application claims the benefit of U.S. Provisional Application Serial No. 60/258,618 entitled "Reliability Assessment of Substation with GIS Type Modules", filed Dec. 27, 2000, and the benefit of U.S. Provisional Application Serial No. 60/258,333 entitled "Reliability Assessment of Substation with AIS Type Modules", also filed Dec. 27, 2000, both of which are hereby incorporated by reference in their entirety.

FIELD OF THE INVENTION

The present invention relates generally to reliability assessment of a power system and more particularly to a system and method for reliability assessment of a power system having integrated components.

BACKGROUND OF THE INVENTION

Typical power systems include individual components such as breakers, disconnectors, grounding switches, tie breakers, potential transformers (PT), current transformers (CT), and the like. An individual component typically handles one function for the power system. The term power system is defined herein as a system having components for transmission and/or distribution of electrical power and includes any portion of the entire power system. For example, the power system may be an entire power transmission and distribution system, a substation, a plurality of substations, a section of a transmission line, a section of a distribution line, and the like.

When a fault or maintenance occurs on an individual component, the individual component should be electrically isolated from live power to be safely repaired or maintained. This is typically accomplished by opening breakers between the faulted component and any power source. After that, disconnectors around the faulted component are opened. The opened breakers and disconnectors protect personnel from being exposed to live power on the component being repaired or maintained.

Faulted components affect the reliability of power systems in many ways. For example, the faulted component is first isolated from the power system, then repaired, and then the power system is restored back to normal operation. Each of these operations takes a certain amount of time to accomplish. In the same manner, maintenance of components affects the reliability of power systems. That is, the maintained component is first isolated from the power system, then maintained, and then the power system is restored back to normal operation.

To quantify the frequency and the amount of time that a component is expected to be unavailable in the power system (i.e., due to a fault or maintenance), a reliability assessment is performed to calculate reliability for each component in the power system. For example, a reliability assessment may calculate, for each component a total outage frequency (e.g., the expected number of times that a component will be de-energized per year). The total outage frequency includes an outage frequency due to a component fault (e.g., the expected number of times that a component will be de-energized due to a component fault), a self maintenance outage frequency (e.g., the expected number of times that a component will be de-energized due to a maintenance of that component), and an other maintenance frequency (e.g., the expected number of times that a component will be de-energized due to maintenance of another component), and the like.

Conventional reliability systems are described in the following publications, all of which are hereby incorporated by reference in their entirety: R. E. Brown, "Probabilistic Reliability and Risk Assessment of Electric Power Distribution Systems," *DistrubuTECH Conference*, San Diego, Calif., February 2001, and R. E. Brown, T. M. Taylor, "Modeling the Impact of Substations on Distribution Reliability," *IEEE Transactions on Power Systems*, Vol. 14, No. 1, February 1999, pp. 349–354.

One type of reliability assessment is referred to as an analytical simulation. The analytical simulation models each system contingency, computes the impact of each contingency, and weighs the impact based upon the expected frequency of the system contingency. This model can accurately model complex system behavior by dynamically enumerating each possible system state. This model uses historical data about reliability and repair and maintenance times and produces expected outage times and duration.

Another type of reliability assessment is referred to as a Monte Carlo simulation. This simulation is similar to the analytical simulation; however, this simulation models random contingencies rather than expected contingencies. This allows components to be modeled with probability distributions rather than expected frequencies. Monte Carlo simulation can model complex system behavior and produces a distribution of possible results rather than expected outage times and duration.

Currently, many companies in the power industry are marketing new types of integrated components for power systems. One such integrated component is a Gas-Insulated Module (GIM). The GIM combines several individual components together in one gas chamber. For example a GIM may include a breaker, a disconnector, a grounding switch, and a PT integrated in one module (i.e., an integrated component).

To repair or maintain a GIM, not only should the faulted individual component be isolated, but because of the proximity of the individual components, the entire GIM should be isolated to be safely repaired or maintained.

Another such integrated component is an Air-Insulated Module (AIM). The AIM combines several individual components together. For example a AIM may include a breaker, a disconnector, a grounding switch, and a PT integrated in one module (i.e., an integrated component). The breaker of the AIM is typically a removable component. That is, the breaker can be removed from the AIM and then repaired.

To repair or maintain an AIM, not only should the faulted individual component be isolated, but because of the proximity of the individual components, the entire AIM should be isolated to be safely repaired or maintained. However, if the faulted component is the removable component, the AIM may be isolated, the faulted component removed for repairing, and the power to the non-removable components of AIM restored.

Conventional reliability assessment systems are designed for a power system having only individual components, rather than having integrated components. Therefore, conventional reliability assessments yield incorrect results when applied to a power system including integrated components. When a power system includes one or more integrated components as well as individual components, conventional reliability assessments may yield even more inaccurate results. With the recent deregulation of power utilities, reliability assessment of power systems is critical for success in the market.

Therefore, a need exists for a system and method for reliability assessment for a power system having an integrated component. Moreover, in light of ever-evolving integrated component design, a need exists for a system and method with the capability to model a newly created integrated component.

SUMMARY OF THE INVENTION

The present invention is directed to a system and method for reliability assessment of a power system having an integrated component.

According to an aspect of the present invention, a system and method is provided for performing a reliability assessment of a power system having an integrated component. The integrated component can be modeled with information about the individual components of the integrated component. Individual component failure rates associated with individual components of the integrated component are retrieved from a data store and a failure rate for the integrated component is determined based on the individual component failure rates. The individual components may include a bushing including a current transformer and a voltage transformer and determining a circuit breaker, a disconnector, a grounding switch, a bushing, a current transformer, a potential transformer, and the like.

According to another aspect of the present invention, a failure time of an individual component associated with an integrated component is used to model the failure time of the integrated component. The failure time may be a mean time to repair.

According to yet another aspect of the present invention, a maintenance frequency of an individual component associated with an integrated component is used to model the maintenance frequency of the integrated component.

According to a further aspect of the present invention, a maintenance time of an individual component associated with an integrated component is used to model the maintenance time of the integrated component. The maintenance time may be a mean time to maintain.

According to another aspect of the present invention, information representative of interconnectivity of individual components of the power system is retrieved and information representative of which individual components are associated with an integrated component is retrieved. The information allows determination of which individual components are associated with an integrated component and fault and maintenance simulations can therefore, be performed accordingly.

According to yet another aspect of the present invention, a reliability assessment is determined based on the interconnectivity information, the information representative of which individual components are associated with an integrated component, the modeled maintenance frequency and time of integrated components of the power system, and the modeled failure rate and time of the integrated components of the power system.

According to a further aspect of the present invention, an integrated component may be a pre-defined integrated component or a user-defined integrated component.

These and other features of the present invention will be more fully set forth hereinafter.

BRIEF DESCRIPTION OF THE DRAWINGS

The present invention is further described in the detailed description that follows, by reference to the noted drawings by way of non-limiting illustrative embodiments of the present invention, in which like reference numerals represent similar parts throughout the several views of the drawings, and wherein.

DETAILED DESCRIPTION OF THE ILLUSTRATIVE EMBODIMENTS

The present invention is directed to a system and method for reliability assessment of a power system having an integrated component.

Exemplary Power System

Figure 1:
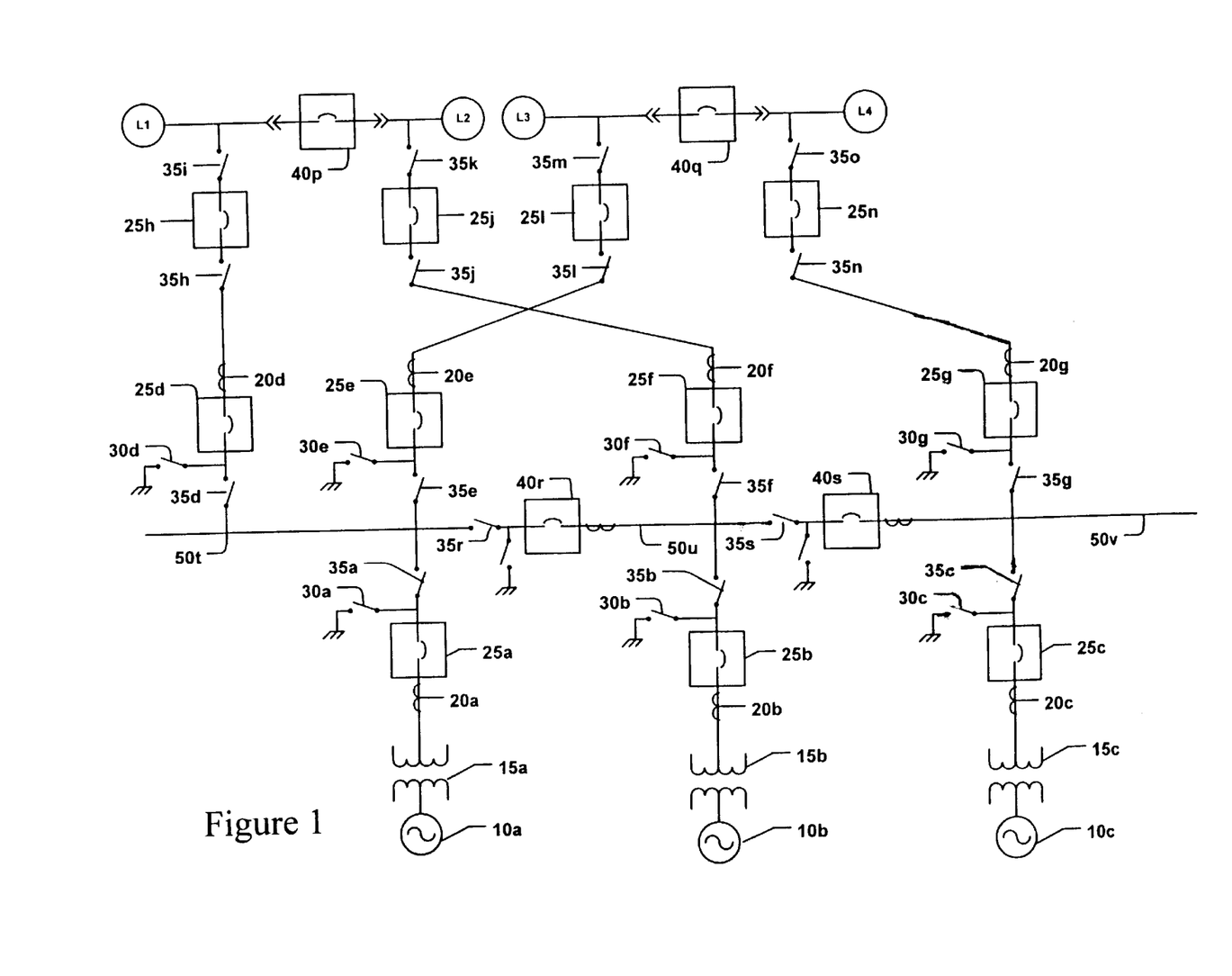
FIG. 1 is a graphical representation of an exemplary power system having only individual power system components for which a conventional reliability assessment system may determine a reliability assessment.

FIG. 1 illustrates an exemplary power system having only conventional individual components. As shown in FIG. 1, generators 10a–c are electrically connected to transformers 15a–c, respectively. Transformers 15a–c are electrically connected to circuit breakers 25a–c, respectively, and current transformers (CTs) 20a–c sense current from transformers 15a–c, respectively. Circuit breakers 25a–c are electrically connected to disconnectors 35a–c, respectively, which are in turn electrically connected to bus bar 50t–v, respectively. Grounding switches 30a–c are electrically connected to circuit breakers 25a–c respectively.

Bus bars 50t–v are electrically connected via tie breakers 40r–s, as shown. From bus bars 50, power is distributed to loads L1–L4, again through various circuit breakers 25 and disconnectors 35. Tie breaker 40p may connect loads L1 and L2, and tie breaker 40q may connect loads L3 and L4.

Tie breakers are normally open, but may be closed when reconfiguring a power system in response to a fault or maintenance. Reconfiguration of a power system attempts to power as many loads as possible, given the fault or maintenance on the power system.

Faults are handled on a power system having individual components as follows. If a fault occurs on circuit breaker 25f, power is interrupted with breakers 25b, 25j, 40r, and 40s, then disconnectors 35j and 35f are opened before repair is performed on circuit breaker 25f. Also, the power system may be reconfigured to supply as many loads as possible during component repair. For example, tie breaker 40p may be closed to provide power to load L2 via circuit breaker 25h, while circuit breaker 25f is being repaired.

Figure 2:
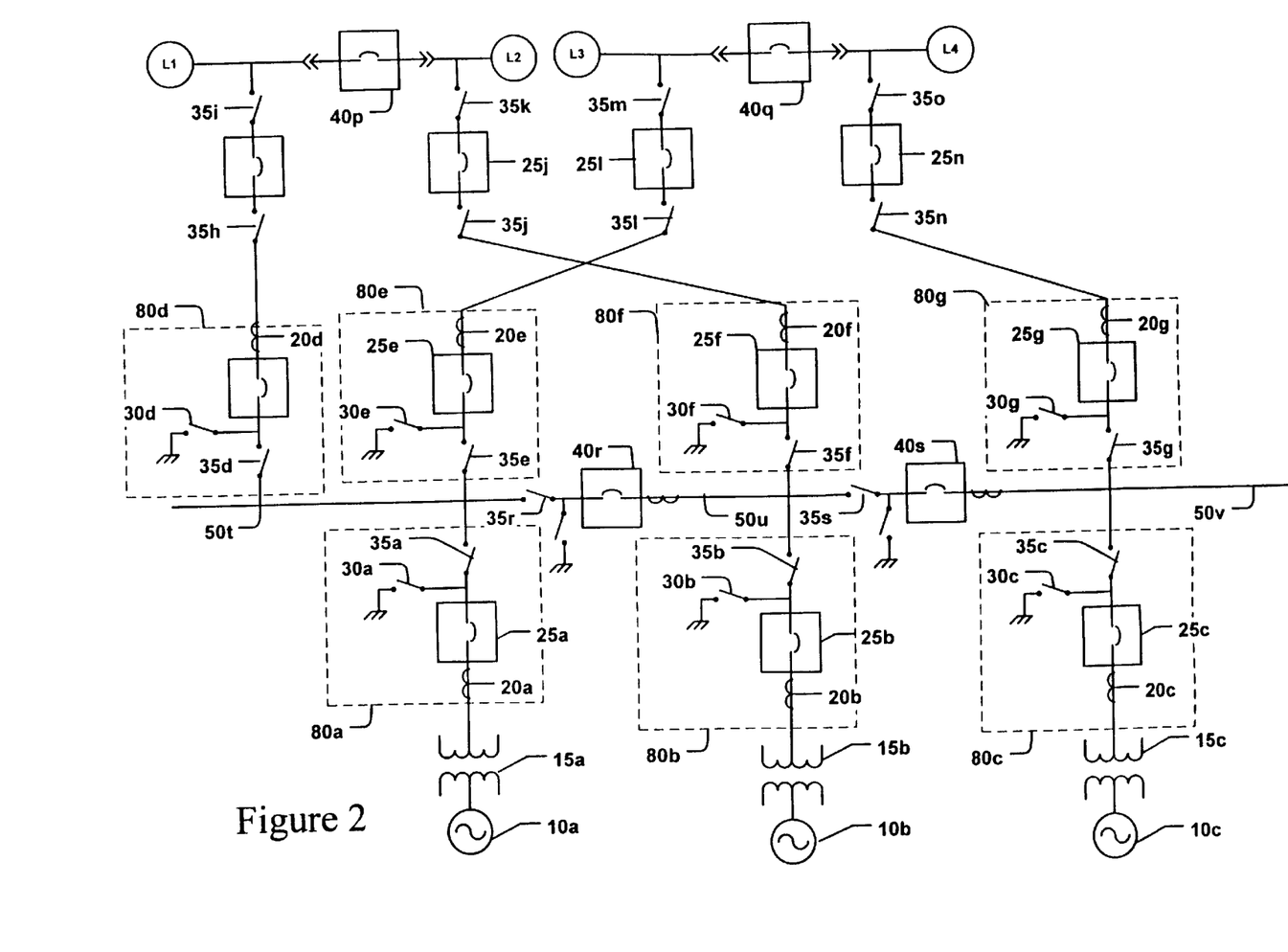
FIG. 2 is a graphical representation of an exemplary power system having gas insulated modules (integrated components) for which one embodiment of the present invention may determine a reliability assessment.

To illustrate a power system having an integrated component, as shown in FIG. 2, integrated component 80f includes disconnector 35f, grounding switch 30f, circuit breaker 25f, and CT 20f. FIG. 2 is illustrative only and is not intended to limit the present invention to any particular configuration of power system components. The present invention may be used to model any power system having an integrated component as long as the integrated component has the same response to faults and maintenance as existing conventional components.

As shown in FIG. 2, the integrated component, module 80f, includes the functionality of several conventional components. That is, module 80f includes the functionality of a disconnector switch, a grounding switch, a circuit breaker and a CT. Several manufactures provide such integrated components. Such integrated components provide advantages; however, the integrated components are handled differently than a group of individual components during a fault or during maintenance.

For example, in a power system having an integrated component, faults are handled as follows. If a fault occurs on any component within module 80f, power is interrupted by breakers 25b, 25j, 40r, and 40s, then disconnectors 35j, 35r, 35s, and 35b are opened before repair is performed on module 80f. As can be seen, in this example, the number of disconnectors that are opened prior to performing a repair is different than for the power system having only individual components. In this example, four disconnectors must be opened to repair the faulted integrated component versus opening only two disconnectors to repair the faulted individual component. Also, the number of breakers that are opened to perform a repair may be different even though the number is the same in this example.

After the fault occurs, the power system may be reconfigured to supply as many loads as possible during component repair. For example, tie breaker 40p may be closed to provide power to load L2 via circuit breaker 25h, while module 80f is being repaired. Because different disconnectors are opened to repair the faulted integrated component, reconfiguration may also be different for a power system having an integrated component. Similarly, isolation and reconfiguration for maintenance of an integrated component may be different than for a power system having only individual components.

In conventional reliability assessments, power system reliability is determined assuming that each component is an individual component and that a faulted component is isolated by opening the appropriate breakers and disconnectors immediately surrounding the faulted component.

However, when a power system includes an integrated component, conventional reliability assessments are no longer correct. First, the failure rate of an integrated component may be different than the failure rate of an individual component because failure of any component of the integrated component may fail the entire integrated component.

Additionally, fault simulation, maintenance simulation, and reconfiguration simulation are all predicated upon an individual component being isolated by opening the disconnectors immediately surrounding the faulted component. This assumption is not always true for a power system having an integrated component.

Therefore, total system reliability may be different in a power system having an integrated component (e.g., a GIM) than in a power system having only individual components. Conventional reliability assessment systems and methods do not factor integrated components into the reliability assessment and therefore, may yield incorrect results.

The present invention allows more accurate reliability assessment for a power system having an integrated component.

Illustrative Computing Environment

Figure 3:
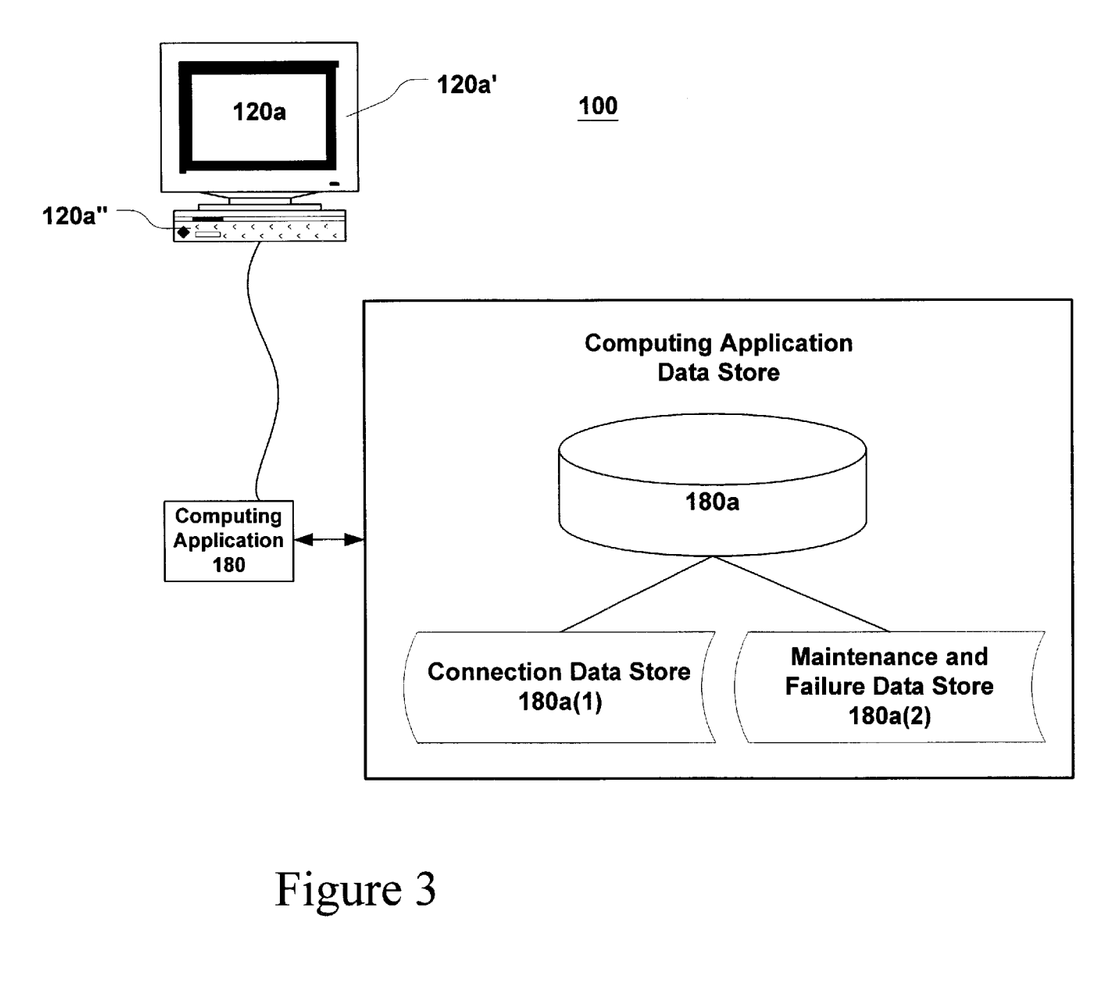
FIG. 3 is a diagram of an exemplary computing environment with which the present invention may be employed, and a storage area in accordance with one embodiment of the present invention.

FIG. 3 shows computing system 100 that may support the present invention. Computing system 100 comprises computer 120a that may comprise user interface 120a' and processing unit 120a". Computer 120a supports computing application 180. As shown, computing application 180 comprises Computing Application data store 180a.

Computing Application data store 180a may contain Connection data store 180a(1) and Maintenance and Failure data store 180a(2), described in more detail below. In operation, a user (not shown) may interface with computing application 180 through the use of computer 120a. The user may navigate through computing application 180 to create and store reliability assessments for power systems.

Data Stores

Connection data store 180a(1) includes information representative of the interconnectivity of individual components of a power system. For example, Connection data store 180a(1) may include information representing the interconnectivity of the components of FIG. 1. In this case, Connection data store 180a(1) includes information representing that generator 10a is electrically connected to transformer 15a, etc.

In one embodiment, interconnectivity data is stored using x and y-coordinates. That is, each individual component includes an x-coordinate and a y-coordinate for each possible point of connection to that individual component. If two components each have the same x and y-coordinates, then those two components are considered to be connected at the points corresponding to such x and y-coordinates.

In addition, each individual component includes a field for representing a group (i.e., the integrated component) corresponding to the individual component. For example, each individual component includes a GroupID field. If the GroupID field value is zero, the individual component is not a component of an integrated component. If the GroupID field value is non-zero, the individual component is a component of an integrated component. All individual components having the same GroupID value are associated with the same integrated component.

Using the interconnectivity information and the GroupID field, the system of the present invention may determine which individual components are components of an integrated component, the internal connections within the integrated component, and the external connections from the integrated component to other components of the power system.

Further, in the present embodiment, each individual component includes a field for representing the name of the group (i.e., the integrated component). For example, each individual component includes a Group Name field. If the Group Name field is set to one of a predefined set of names, then the individual component is one of a predefined type of integrated components. For example, if the Group Name field is set to "PASS", then the integrated component is a PASS type module. If the Group Name field is not set to one of a predefined set of names, then the individual component is not one of a predefined set of integrated components; rather, the integrated component is a user-defined integrated component. In the present embodiment, the predefined set of names includes "GIS" for a GIS module, "PASS" for a PASS switching module, "LTB Combined" for a LTB Combined module, "AIS" for an Air-Insulated Switchgear, and "LTB Compact" for a LTB Compact module.

Figure 4A:
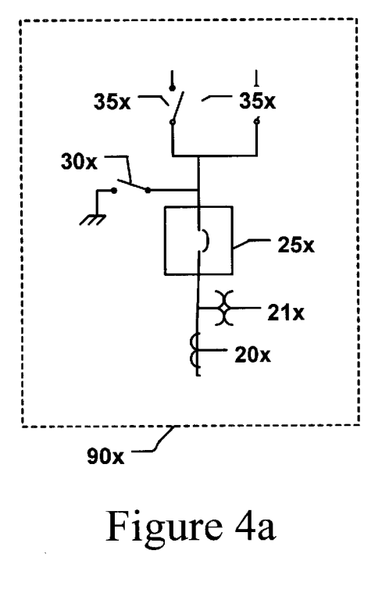
FIGS. 4a through 4d are diagrams of predefined integrated components in accordance with one embodiment of the present invention.
Figure 4B:
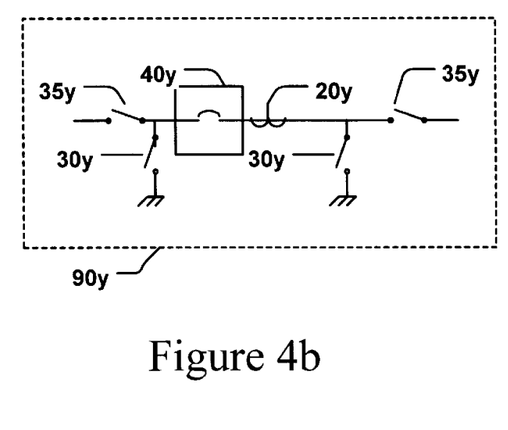
Figure 4C:
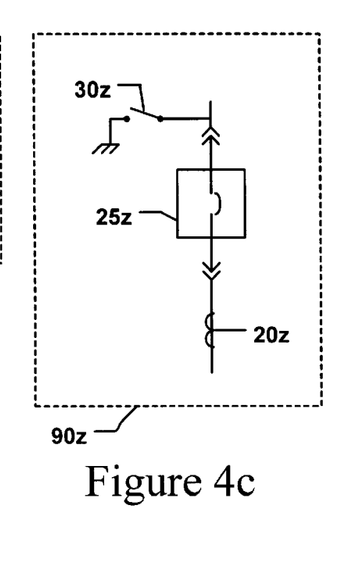
Figure 4D:
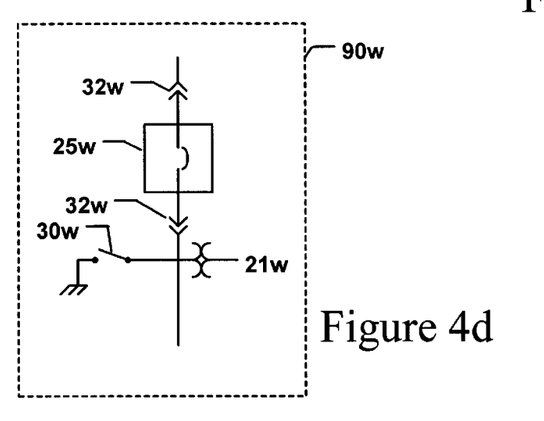

An illustrative PASS switching module is shown in FIG. 4a. As shown in FIG. 4a, PASS switching module 90x includes a CT 20x, a potential transformer 21x, a grounding switch 30x, a breaker 25x, and two disconnectors 35x. An illustrative GIS module is shown in FIG. 4b. As shown in FIG. 4b, GIS module 90y includes a breaker 40y, a CT 20y, two grounding switches 30y, and two disconnectors 35y. An illustrative LTB Combined module is shown in FIG. 4c. As shown in FIG. 4c, LTB Combined module 90z includes a breaker 25z, a CT 20z, and a grounding switch 30z. A typical AIS module includes a breaker, a disconnector, a grounding switch, a digital optical current transformer, and a set of fixed contacts. An illustrative LTB Compact module is shown in FIG. 4d. As shown in FIG. 4d, LTB Compact module 90w includes a breaker 25w, a set of fixed contacts 32w, a PT 21w, and a grounding switch 30w. The breaker 25w may be removed from the LTB Compact module 90w to be repaired or maintained. However, if one of the fixed contacts 32w or another non-removable component is repaired or maintained, then the entire module 90w is isolated.

A predefined name can be associated with a particular configuration of components, for example, one of the configurations shown in FIGS. 4a through 4c. Also, a predefined name can be associated with a particular set of maintenance and failure rates and times.

A user can define an integrated component with a name other than the predefined set of names and with a configuration other than the predefined set of integrated components; however, the new user-defined integrated component should have the same behavior as any other GIM or AIM. A user cannot define a new integrated component that has a different behavior than a GIM or an AIM.

Maintenance and Failure data store 180a(2) may include information representative of individual component maintenance times, maintenance frequencies, failure times, and failure frequencies.

In one embodiment, Maintenance and Failure data store 180a(2) includes for each component type a Maintenance Frequency (MF), a Mean Time to Maintain (MTTM), a Failure Rate (FR), a Mean Time to Repair (MTTR), and a Mean Time to Switch (MTTS) for switching components.

MF is the frequency of scheduled maintenance per year. If the number is less than one, the component is maintained less than once per year. For such maintenance, a component is isolated by opening all surrounding disconnectors. MTTM is the expected mean duration of a scheduled maintenance and is usually expressed in hours. FR of a component is the frequency of failures per year. These failures lead to an isolation of the faulty component by immediate tripping of a protection system. MTTR is the expected mean duration starting with tripping of the protection system, the duration for locating and analyzing the failure, and the duration for repair until such time as the system is restored to normal operating conditions. MTTR is typically expressed in hours. MTTS is the expected mean duration needed to locate the failure, to isolate a faulted component, and to reconfigure the power system to supply as many loads as possible and is usually expressed in hours.

Failure of an Integrated Component

Figure 5:
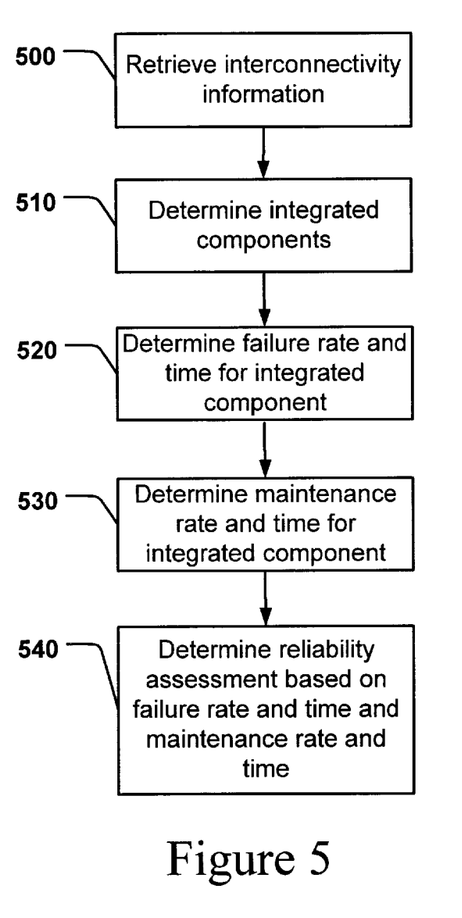
FIG. 5 is a flow chart of a method in accordance with one embodiment of the present invention.

FIG. 5 is a flow chart of a method in accordance with an embodiment of the present invention. As shown in FIG. 5, at step 500, computing application 180 retrieves interconnectivity information from Connection data store 180a(1). Additionally, computing application 180 may retrieve interconnectivity information from user interface 120a', for example, if a user (not shown) is inputting a new power system into computing application 180. Also, interconnectivity information retrieved from Connection data store 180a(1) may be modified via user interface 120a'.

At step 510, computing application 180 determines which components are integrated components. In the present embodiment, each component includes a GroupID field. If the GroupID field is zero, the individual component is not a component of an integrated component. If the GroupID field is not zero, the individual component is a component of an integrated component. For individual components, conventional reliability assessment techniques are performed. For integrated components, however, steps 520 through 540 are performed.

At step 520, the system determines a failure frequency and time for an integrated component of a power system by retrieving individual component failure rates and times associated with at least one individual component of the integrated component from Maintenance and Failure data store 180a(2).

An integrated component failure rate is determined based on at least one individual component failure rate associated with individual components of the integrated component. For example, for a GIS module, which includes a circuit breaker, a disconnector, a grounding switch, and a bushing (including a current transformer and a voltage transformer), the total GIS failure rate is determined according to:

$$FR_{GIS} = FR_{CB,\ GIS} + FR_{DS,\ GIS} + FR_{GS,\ GIS} + FR_{B/CT/VT,\ GIS}$$

where $FR_{GIS}$ is the failure rate of the GIS, $FR_{CB,\ GIS}$ is a failure rate of the circuit breaker of the GIS, $FR_{DS,\ GIS}$ is a failure rate of the disconnector of the GIS, $FR_{GS,\ GIS}$ is a failure rate of the grounding switch of the GIS, and $FR_{B/CT/VT,\ GIS}$ is a failure rate of the bushing (including a current transformer and a voltage transformer) of the GIS.

The failure rates $FR_{CB,\ GIS}$, $FR_{DS,\ GIS}$, $FR_{GS,\ GIS}$, may be stored in Maintenance and Failure data store 180a(2) and may be representative of the failure rates of the individual components; however, the failure rates may be used to model the failure rate of an integrated component, as described above.

For a PASS module, which includes a circuit breaker, a disconnector, a grounding switch, and a bushing (including a current transformer and a voltage transformer), the PASS failure rate is determined according to:

$$FR_{PASS} = FR_{CB,\ PASS} + FR_{DS,\ PASS} + FR_{GS,\ PASS} + FR_{B/CT/VT,\ PASS}$$

where $FR_{PASS}$ is the failure rate of the PASS, $FR_{CB,\ PASS}$ is a failure rate of the circuit breaker of the PASS, $FR_{DS,\ PASS}$ is a failure rate of the disconnector of the PASS, $FR_{GS,\ PASS}$ is a failure rate of the grounding switch of the PASS, and $FR_{B/CT/VT,\ PASS}$ is a failure rate of the bushing (including a current transformer and a voltage transformer) of the PASS.

The failure rates $FR_{CB,\ PASS}$, $FR_{DS,\ PASS}$, $FR_{GS,\ PASS}$, and $FR_{B/CT/VT,\ PASS}$ may be stored in Maintenance and Failure data store 180a(2) and may be representative of the failure rates of the individual components; however, the failure rates may be used to model the failure rate of an integrated component, as described above.

For a LTB Combined module, which includes a circuit breaker, a digital optical current transformer, and a grounding switch, the LTB Combined failure rate is determined according to:

$$FR_{LTB\ Combined} = FR_{CB,\ LTB\ Combined} + FR_{DOCT,\ LTB\ Combined} + FR_{GS,\ LTB\ Combined}$$

where $FR_{LTB\ Combined}$ is the failure rate of the LTB Combined module, $FR_{CB,\ LTB\ Combined}$ is a failure rate of the circuit breaker of the LTB Combined module, $FR_{DOCT,\ LTB\ Combined}$ is a failure rate of the digital optical current transformer of the LTB Combined module, and $FR_{GS,\ LTB\ Combined}$ is a failure rate of the grounding switch of the LTB Combined module.

The failure rates $FR_{CB,\ LTB\ Combined}$, $FR_{DOCT,\ LTB\ Combined}$, and $FR_{GS,\ LTB\ Combined}$ may be stored in Maintenance and Failure data store 180a(2) and may be representative of the failure rates of the individual components; however, the failure rates may be used to model the failure rate of an integrated component, as described above.

For an AIS, which includes a circuit breaker, a disconnect switch, a digital optical current transformer, a grounding switch, and a set of fixed contacts the AIS failure rate is determined according to:

$$FR_{AIS,\ Module} = FR_{CB,\ AIS} + (0.9 * FR_{DS,\ AIS}) + FR_{DOCT,\ AIS} + FR_{GS,\ AIS}$$

and $$FR_{AIS,\ FC} = 2 * 0.05 * FR_{DS,\ AIS}$$

where $FR_{AIS,\ Module}$ is the failure rate of the AIS module, $FR_{AIS,\ FC}$ is the failure rate of the AIS fixed contacts, $FR_{CB,\ AIS}$ is a failure rate of the circuit breaker of the AIS, $FR_{DS,\ AIS}$ is a failure rate of the disconnector of the AIS, $FR_{DOCT,\ AIS}$ is a failure rate of the digital optical current transformer of the AIS, and $FR_{GS,\ AIS}$ is a failure rate of the grounding switch of the AIS.

The failure rates $FR_{CB,\ AIS}$, $FR_{DS,\ AIS}$, $FR_{DOCT,\ AIS}$, and $FR_{GS,\ AIS}$ may be stored in Maintenance and Failure data store 180a(2) and may be representative of the failure rates of the individual components; however, the failure rates may be used to model the failure rate of an integrated component, as described above.

Further, for a GIM module, the MTTR of the integrated component is determined as the MTTR of one of the individual components of the integrated component. For example, the MTTR of the integrated component may be modeled as the MTTR of a circuit breaker of a GIM module. This technique models the repair of an integrated component in accordance with the actual repair of an integrated component. That is, when a integrated component is repaired, the repair time typically includes time to remove gas from the module, time to open the gas chamber, time to repair the faulted individual component of the integrated component, time to close the chamber, and time to add gas to the module. As such, repairs to an GIM integrated component are similar enough to be modeled with a single MTTR.

For an AIS module, the MTTR of the integrated component is determined as the MTTR of either the fixed contacts or the circuit breaker. For example, the MTTR of the AIS may be modeled as the MTTR of a circuit breaker of a AIS module for a fault on the removable portion of the AIS module. The MTTR of the AIS may be modeled as the MTTR of the fixed contacts of the AIS module for a fault on the non-removable portion of the AIS module. This technique models the repair of an integrated component in accordance with the actual repair of an integrated component.

Maintenance of an Integrated Component

At step 530, computing application 180 determines a maintenance frequency and time by retrieving an individual component maintenance frequency and time associated with the individual components of the integrated component from the Maintenance and Failure data store 180a(2).

An integrated component maintenance time may be determined based on the individual component maintenance times associated with individual components of the integrated component. In one embodiment of the present invention, an integrated component is modeled as being maintained for a Mean Time To Maintain (MTTM) at a Maintenance Frequency (MF). Typically, the breaker of the integrated component is assigned the MF of the integrated component, although any component of the integrated component may be assigned the MF of the integrated component. The rest of the individual components of the integrated component are assigned a MF of zero.

For example, a breaker of a GIM may have a MF of once per 15 years and the other components of the GIM have their MF set to zero. This more accurately models the actual maintenance of an integrated component. That is, with an integrated component, each individual component is not maintained on a separate maintenance schedule; rather, the entire GIM is maintained as a unit, for example, once every 15 years.

At step 540, a reliability assessment is determined based upon the determined failure frequencies and times and maintenance frequencies and times of the integrated components determined in steps 520 and 530 and the interconnectivity and grouping information from steps 500 and 510. For example, using an analytical simulation, the reliability assessment is performed via a fault simulation and a maintenance simulation.

Fault Simulation

When a fault is simulated in an integrated component, computing application 180 recognizes that the faulted component belongs to the integrated component, as described above at step 510.

All external connections between the integrated component and the power system are identified. As described above, one technique for identifying all external connections includes reading the x and y-coordinates of connection points and the GroupID's for each component. If two components have the same x and y-coordinate, then the two components are connected. If two components having the same x and y-coordinates, have the same non-zero GroupID, then each of the two components is a component of an integrated component. If two components having the same x and y-coordinates have a GroupID of zero, then the two components are individual components. If two components have the same x and y-coordinates, one component has a non-zero GroupID, and the other component has a GroupID of zero, then this point is an external connection from an integrated component.

After external connections from an integrated component are identified, computing application 180 simulates isolation on the entire integrated component, not only the faulted component. When a fault is simulated in a device outside of an integrated component, computing application 180 recognizes that the faulted device would trip all of the closed breakers from the power supply side of the faulted component. For example, a fault on a busbar will cause all of the closed breakers from the power supply side of the faulted component to trip. All connections between the busbar and the rest of the power system are identified. Then, computing application 180 simulates isolation on the busbar, by simulating opening of disconnectors. Next, power system reconfiguration is simulated to supply power to as many loads as possible.

For an analytical simulation, computing application determines the effect of the simulated fault on the faulted component and on every other component in the system. Computing application 180 stores this information for later use.

For example, breaker 25f may have a MTTR of 16 hours and disconnector 35f may have a FR of 0.00038 times per year. To simulate a fault of disconnector 35f, as shown in FIG. 2, at step 500, computing application 180 retrieves interconnectivity information.

At step 510, computing application 180 determines which components are integrated components. In this example, computing application 180 determines that disconnector 35ƒ and breaker 25ƒ are part of an integrated component (i.e., integrated component 80ƒ) because they have a non-zero GroupID.

At step 520, computing application 180 models the failure time for the integrated component 80ƒ. The MTTR of 16 hours is used because the GroupID of disconnector 35ƒ is non-zero (i.e., part of an integrated component). Using the interconnectivity information, the nearest breakers are modeled as tripped. For this example, breakers 25b, 25j, 40r, and 40s are modeled as opened. Breaker 25ƒ is not modeled as opened because faulted disconnector 35ƒ and breaker 25ƒ belong to the same GIS, i.e. they have the same GroupID. Next, module 80ƒ is modeled as isolated with disconnectors 35b, 35r, 35s and 35j. Then the system is reconfigured by modeling the switching of breaker 40p to supply load 2. This configuration exists for the MTTR of 16 hours.

All of the components without power caused by the fault of disconnector 35ƒ within module 80ƒ are powerless for 16 hours with an outage frequency equal of 0.00038. Also, Load 2 is interrupted for the MTTS of breaker 40p and generator 10b is out of service for MTTR of 16 hours.

In this manner, the present invention may model a fault of an integrated component in a power system and reconfiguration for reliability assessment of the power system.

Maintenance Simulation

Power system components typically receive regular maintenance in addition to repair due to faults. In a power system having individual components, each component may be maintained and isolated separately. However, during maintenance of an integrated component, the entire integrated component should be isolated, similar to repair of a faulted integrated component, as discussed above.

Maintenance simulated on an integrated component causes the simulation of isolation of the entire integrated component. All external connections between the integrated component and the power system are identified. Then, computing application 180 simulates isolation on the entire integrated component by simulating opening of disconnectors. Next, power system reconfiguration is simulated to supply power to as many loads as possible.

For example, the maintenance time of integrated component 80ƒ, as shown in FIG. 2, may be modeled. Breaker 25ƒ may have a MF of 0.0667 times per year and a MD of 56 hours. To model maintenance time of integrated component 80ƒ, at step 500, computing application 180 retrieves interconnectivity information.

At step 510, computing application 180 determines which components are integrated components. In this example, computing application 180 determines that disconnector 35ƒ and breaker 25ƒ are part of an integrated component (i.e., integrated component 80ƒ) because they have a non-zero GroupID.

At step 520, computing application 180 models the maintenance time for the integrated component 80ƒ. Only breaker 25ƒ within module 80ƒ has a non-zero MF and MD. Since breaker 25ƒ has a non-zero GroupID, the entire module will be modeled as being isolated for 56 hours. The isolation and reconfiguration of integrated component 80ƒ is the same as for a fault, as described above. In this example, the duration is 56 hours and frequency is 0.0667 times per year. All of the components without power caused by the maintenance of module 80ƒ have an interruption of 56 hours for 0.0667 times per year.

For an analytical simulation, computing application determines the effect of the simulated maintenance on the maintained component and on every other component in the system. Computing application 180 stores this information for later use.

In this manner, the present invention may model maintenance of an integrated component of a power system and reconfiguration for reliability assessment of the power system.

Reliability Assessment

Using the maintenance simulation and the fault simulation information as described above, a reliability assessment may be determined using conventional reliability assessment techniques. As was described above, any fault or maintenance can contribute to the outage frequency and outage duration of a component. Modeling the faulting and maintaining of components within the power system with a specific FR, MTTR, MF, and MDs (including those applied to integrated components) and simulating a fault and maintenance results in each component's total contribution to outage frequency and duration to every other component in the system. As a result, each component has a total Outage Frequency and Outage Duration equal to the sum of the contributions from every component in the power system.

Creation of New Integrated Module Types

Figure 6:
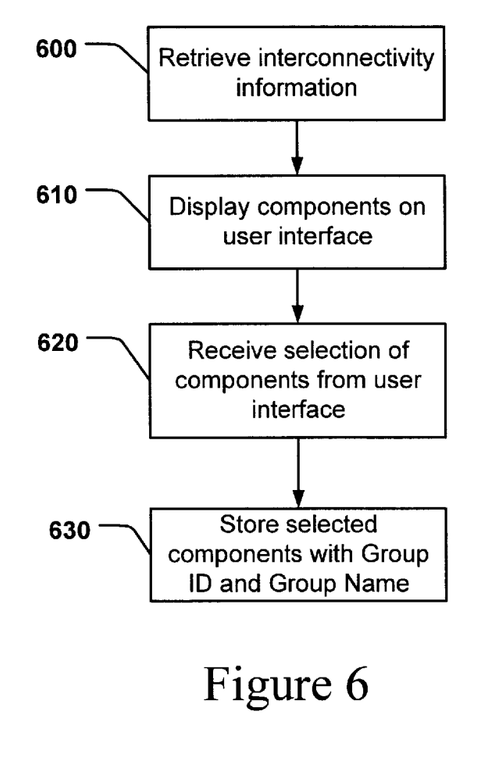
FIG. 6 is a flow chart of another method in accordance with one embodiment of the present invention.

Because new integrated power system components are routinely developed, the present invention allows the creation of a user-defined integrated component, as shown in the flow chart of FIG. 6. In one embodiment, a user may use a graphical representation of the power system to select the individual components to be included in the integrated component. For example, computing application 180 may graphically display a power system on the user interface, similar to the graphical representation as shown in FIG. 1.

To display the power system, computing application 180 retrieves component interconnectivity information from Connection data store 180a(1), as shown at step 600. Computing application 180 displays a graphic representation of a power system on user interface 120a' based on the retrieved information, at step 610.

In one embodiment, a user may group a combination of individual components which correspond to a new user-defined integrated component by selecting individual components. For example, the user may draw a box around the selected components with a mouse. Computing application 180 receives the selected individual components, at step 620.

At step 630, Computing application 180 stores each individual component with a non-zero GroupID and a common Group Name. The GroupID and Group Name are stored in Connection data store 180a(1). The Group Name may be selected from a predefined list of integrated components or may be a name entered by a user.

In this manner, the present invention has the capability to model newly developed types of integrated components. The only requirement is that the new types of integrated component have the same response to power faults and equipment maintenance as existing integrated components.

CONCLUSION

In sum, the present invention provides a system and method to efficiently model, simulate, manage, and store reliability assessments of a power system having integrated components. Further, the present invention has the capability to model newly developed types of integrated components.

The present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the present invention. While the invention has been described with reference to illustrative embodiments, it is understood that the words which have been used herein are words of description and illustration, rather than words of limitations. Further, although the invention has been described herein with reference to particular structures, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A method for providing a reliability assessment of a power system having individual components and an integrated component that is comprised of at least two individual components packaged into a single module, the method comprising:

retrieving individual component failure rates associated with the at least two individual components of the integrated component; and determining a failure rate of the integrated component according to the sum of the failure rates associated with the at least two individual components.

2. The method as recited in claim 1, wherein the integrated component is a Gas Insulated Switchgear (GIS) module comprising a circuit breaker, a disconnector, a grounding switch, and a bushing including a current transformer and a potential transformer and determining a failure rate comprises determining the failure rate according to:

$$FR_{GIS} + F_{CB, GIS} + FR_{DS, GIS} + FR_{ES, GIS} + FR_{B/CT/VT, GIS}$$

where $FR_{GIS}$ is the failure rate of the GIS module, $FR_{CB, GIS}$ is a failure rate of the circuit breaker of the GIS, $FR_{DS, GIS}$ is a failure rate of the disconnector of the GIS, $FR_{ES, GIS}$ is a failure rate of the grounding switch of the GIS, and and $FR_{B/CT/VT, GIS}$ is a failure rate of the bushing including the current transformer and the potential transformer.

3. The method as recited in claim 1, wherein the integrated component is a PASS module comprising a circuit breaker, a disconnector, a grounding switch, and a bushing including a current transformer and a voltage transformer and determining a failure rate comprises determining the failure rate according to:

$$FR_{PASS} = FR_{CB, PASS} + FR_{DS, PASS} + FR_{GS, PASS} + FR_{B/CT/VT, PASS}$$

where $FR_{PASS}$ is the failure rate of the PASS module, $FR_{CB, PASS}$ is a failure rate of the circuit breaker of the PASS module, $FR_{DS, PASS}$ is a failure rate of the disconnector of the PASS module, $FR_{GS, PASS}$ is a failure rate of the grounding switch of the PASS module, and $FR_{B/CT/VT, PASS}$ is a failure rate of the bushing including a current transformer and a voltage transformer of the PASS module.

4. The method as recited in claim 1, wherein the integrated component is a Live Tank Breaker (LTB) Combined module comprising a circuit breaker, a digital optical current transformer, and a grounding switch and determining a failure rate comprises determining the failure rate according to:

$$FR_{LTB\ Combined} = FR_{CB,\ LTB\ Combined} + FR_{DOCT,\ LTB\ Combined} + FR_{GS,\ LTB\ Combined}$$

where $FR_{LTB\ Combined}$ is the failure rate of the LTB Combined module, $FR_{CB,\ LTB\ Combined}$ is a failure rate of the circuit breaker of the LTB Combined module, $FR_{DOCT,\ LTB\ Combined}$ is a failure rate of the digital optical current transformer of the LTB Combined module, and $FR_{GS,\ LTB\ Combined}$ is a failure rate of the grounding switch of the LTB Combined module.

5. The method as recited in claim 1, wherein the integrated component is an Air Insulated Switchgear (AIS) comprising a circuit breaker, a disconnector, a digital optical current transformer, a grounding switch, and a set of fixed contacts and determining a failure rate comprises determining the failure rate according to:

$$F_{AIS,\ Module} = FR_{CB,\ AIS} + (0.9 * FR_{DS,\ AIS}) + FR_{DOCT,\ AIS} + FR_{GS,\ AIS}$$

and $$FR_{AIS,\ FC} = 2 * 0.05 * FR_{DS,\ AIS}$$

where $FR_{AIS,\ Module}$ is the failure rate of the AIS module excluding the fixed contacts, $FR_{AIS,\ FC}$ is the failure rate of the fixed contacts of the AIS, $FR_{CB,\ AIS}$ is a failure rate of the circuit breaker of the AIS, $FR_{DS,\ AIS}$ is a failure rate of the disconnector of the AIS, $FR_{DOCT,\ AIS}$ is a failure rate of the digital optical current transformer of the AIS, and $FR_{GS,\ AIS}$ is a failure rate of the grounding switch of the AIS.

6. The method as recited in claim 1, further comprising:

retrieving at least one individual component failure time associated with an individual component of the integrated component; and determining a failure time of the integrated component based on the individual component failure time.

7. The method as recited in claim 6, wherein determining a failure time comprises setting the determined failure time to the failure time of a circuit breaker of the integrated component if a removable portion of the integrated component is faulted and setting the determined failure time to the failure time of a set of fixed contacts if the set of fixed contacts is faulted.

8. The method as recited in claim 6, wherein determining a failure time comprises setting the determined failure time to the failure time of a circuit breaker of the integrated component.

9. The method as recited in claim 6, further comprising:
retrieving at least one individual component maintenance frequency associated with an individual component of the integrated component; and
determining a maintenance frequency of the integrated component based on the individual component maintenance frequency.

10. The method as recited in claim 9, wherein determining a maintenance frequency comprises setting the determined maintenance frequency to the maintenance frequency of a circuit breaker of the integrated component.

11. The method as recited in claim 9, further comprising:
retrieving at least one individual component maintenance time associated with individual components of the integrated component; and
determining a maintenance time of the integrated component based on at least one individual component maintenance time.

12. The method as recited in claim 11, wherein determining a maintenance time comprises setting the determined maintenance time to the maintenance time of a circuit breaker of the integrated component.

13. The method as recited in claim 11, wherein determining a maintenance time further comprises setting maintenance times of other components of the integrated component to zero.

14. The method as recited in claim 11, further comprising:
retrieving information representative of interconnectivity of individual components of the power system; and
retrieving information representative of which individual components are associated with an integrated component.

15. The method as recited in claim 14, further comprising:
determining a reliability assessment based on the interconnectivity information, the information representative of which individual components are associated with an integrated component, the determined maintenance frequency and time of integrated components of the power system, and the determined failure rate and time of the integrated components of the power system.

16. The method as recited in claim 1, further comprising:
receiving a selection of individual components from a user interface; and
storing each selected individual component with a common identification that identifies each selected individual component as being part of an integrated component.

17. The method as recited in claim 16, further comprising:
selecting a unique identification number for the user-defined integrated component; and
storing the unique identification number corresponding each selected individual component in a data store.

18. The method as recited in claim 17, further comprising:
receiving a name for the user-defined integrated component from a user interface; and
storing the name corresponding user-defined integrated component in a data store associated with each selected individual component.

19. A reliability assessment system for a power system having individual components and an integrated component that is comprised of at least two individual components packaged into a single module, the reliability assessment system comprising:
a first data store comprising information representative of the interconnectivity of individual components of the power system and information representative of which individual components are associated with the integrated component;
a second data store comprising information representative of maintenance times, maintenance frequencies, failure rates, and failure times of individual components; and
a computing application, the computing application cooperating with the first and second data stores and retrieving individual component failure rates associated with the at least two individual components of the integrated component, and determining a failure rate of the integrated component according to the sum of the failure rates associated with the at least two individual components.

20. The system as recited in claim 19, wherein the integrated component is a Gas Insulated Switchgear (GIS) module comprising a circuit breaker, a disconnector, a grounding switch, and a bushing including a current transformer and a potential transformer and determining a failure rate comprises determining the failure rate according to:

$$FR_{GIS}=FR_{CB,\ GIS}+FR_{DS,\ GIS}+FR_{ES,\ GIS}+FR_{B/CT/VT,\ GIS}$$

where
$FR_{GIS}$ is the failure rate of the GIS module,
$FR_{CB,\ GIS}$ is a failure rate of the circuit breaker of the GIS,
$FR_{DS,\ GIS}$ is a failure rate of the disconnector of the GIS,
$FR_{ES,\ GIS}$ is a failure rate of the grounding switch of the GIS, and
and $FR_{B/CT/VT,\ GIS}$ is a failure rate of the bushing including the current transformer and the potential transformer.

21. The system as recited in claim 19, wherein the integrated component is a PASS module comprising a circuit breaker, a disconnector, a grounding switch, and a bushing including a current transformer and a voltage transformer and determining a failure rate comprises determining the failure rate according to:

$$FR_{PASS}=FR_{CB,\ PASS}+FR_{DS,\ PASS}+FR_{GS,\ PASS}+FR_{B/CT/VT,\ PASS}$$

where
$FR_{PASS}$ is the failure rate of the PASS module,
$FR_{CB,\ PASS}$ is a failure rate of the circuit breaker of the PASS module,
$FR_{DS,\ PASS}$ is a failure rate of the disconnector of the PASS module,
$FR_{GS,\ PASS}$ is a failure rate of the grounding switch of the PASS module, and
$FR_{B/CT/VT,\ PASS}$ is a failure rate of the bushing including a current transformer and a voltage transformer of the PASS module.

22. The system as recited in claim 19, wherein the integrated component is a Live Tank Breaker (LTB) Combined module comprising a circuit breaker, a digital optical current transformer, and a grounding switch and determining a failure rate comprises determining the failure rate according to:

$$FR_{LTB\ Combined} = FR_{CB,\ LTB\ Combined} + FR_{DOCT,\ LTB\ Combined} + FR_{GS,\ LTB\ Combined}$$

where $FR_{LTB\ Combined}$ is the failure rate of the LTB Combined module, $FR_{CB,\ LTB\ Combined}$ is a failure rate of the circuit breaker of the LTB Combined module, $FR_{DOCT,\ LTB\ Combined}$ is a failure rate of the digital optical current transformer of the LTB Combined module, and $FR_{GS,\ LTB\ Combined}$ is a failure rate of the grounding switch of the LTB Combined module.

23. The system as recited in claim 19, wherein the integrated component is an Air Insulated Switchgear (AIS) comprising a circuit breaker, a disconnector, a digital optical current transformer, a grounding switch, and a set of fixed contacts and determining a failure rate comprises determining the failure rate according to:

$$FR_{AIS,\ Module} = FR_{CB,\ AIS} + (0.9 * FR_{DS,\ AIS}) + FR_{DOCT,\ AIS} + FR_{GS,\ AIS}$$

and $$FR_{AIS,\ FC} = 2 * 0.05 * FR_{DS,\ AIS}$$

where $FR_{AIS,\ Module}$ is the failure rate of the AIS module excluding the fixed contacts, $FR_{AIS,\ FC}$ is the failure rate of the fixed contacts of the AIS, $FR_{CB,\ AIS}$ is a failure rate of the circuit breaker of the AIS, $FR_{DS,\ AIS}$ is a failure rate of the disconnector of the AIS, $FR_{DOCT,\ AIS}$ is a failure rate of the digital optical current transformer of the AIS, and $FR_{GS,\ AIS}$ is a failure rate of the grounding switch of the AIS.

24. The system as recited in claim 19, wherein the processor further performs:

retrieving at least one individual component failure time associated with an individual component of the integrated component; and determining a failure time of the integrated component based on the individual component failure time.

25. The system as recited in claim 24, wherein determining a failure time comprises setting the determined failure time to the failure time of a circuit breaker of the integrated component if a removable portion of the integrated component is faulted and setting the determined failure time to the failure time of a set of fixed contacts if the set of fixed contacts is faulted.

26. The system as recited in claim 24, wherein determining a failure time comprises setting the determined failure time to the failure time of a circuit breaker of the integrated component.

27. The system as recited in claim 24, wherein the processor further performs:

retrieving at least one individual component maintenance frequency associated with an individual component of the integrated component; and determining a maintenance frequency of the integrated component based on the individual component maintenance frequency.

28. The system as recited in claim 27, wherein determining a maintenance frequency comprises setting the determined maintenance frequency to the maintenance frequency of a circuit breaker of the integrated component.

29. The system as recited in claim 27, wherein the processor further performs:

retrieving at least one individual component maintenance time associated with individual components of the integrated component; and determining a maintenance time of the integrated component based on at least one individual component maintenance time.

30. The system as recited in claim 29, wherein determining a maintenance time comprises setting the determined maintenance time to the maintenance time of a circuit breaker of the integrated component.

31. The system as recited in claim 29, wherein determining a maintenance time further comprises setting maintenance times of other components of the integrated component to zero.

32. The system as recited in claim 29, wherein the processor further performs:

retrieving information representative of interconnectivity of individual components of the power system; and retrieving information representative of which individual components are associated with an integrated component.

33. The system as recited in claim 32, wherein the processor further performs:

determining a reliability assessment based on the interconnectivity information, the information representative of which individual components are associated with an integrated component, the determined maintenance frequency and time of integrated components of the power system, and the determined failure rate and time of the integrated components of the power system.

34. The system as recited in claim 19, wherein the processor further performs:

receiving a selection of individual components from a user interface; and storing each selected individual component with a common identification that identifies each selected individual component as being part of the integrated component.

35. The system as recited in claim 34, wherein the processor further performs:

selecting a unique identification number for the user-defined integrated component; and storing the unique identification number corresponding each selected individual component in a data store.

36. The system as recited in 35, wherein the processor further performs:

receiving a name for the user-defined integrated component from a user interface; and storing the name corresponding user-defined integrated component in a data store associated with each selected individual component.

37. A computer-readable medium having computer-readable instructions stored thereon for providing a reliability assessment of a power system having individual components and an integrated component that is comprised of at least two individual components packaged into a single module, the instructions when executed on a processor performing the following:

retrieving individual component failure rates associated with the at least two individual components of the integrated component; and determining a failure rate of the integrated component according to the sum of the failure rates associated with the at least two individual components.

38. The computer-readable medium as recited in claim 37, wherein the integrated component is a Gas Insulated Switchgear (GIS) module comprising a circuit breaker, a disconnector, a grounding switch, and a bushing including a current transformer and a potential transformer and determining a failure rate comprises determining the failure rate according to:

$$FR_{GIS}=FR_{CB,\ GIS}+FR_{DS,\ GIS}+FR_{ES,\ GIS}+FR_{B/CT/VT,\ GIS}$$

where $FR_{GIS}$ is the failure rate of the GIS module, $FR_{CB,\ GIS}$ is a failure rate of the circuit breaker of the GIS, $FR_{DS,\ GIS}$ is a failure rate of the disconnector of the GIS, $FR_{ES,\ GIS}$ is a failure rate of the grounding switch of the GIS, and and $FR_{B/CT/VT,\ GIS}$ is a failure rate of the bushing including the current transformer and the potential transformer.

39. The computer-readable medium as recited in claim 37, wherein the integrated component is a PASS module comprising a circuit breaker, a disconnector, a grounding switch, and a bushing including a current transformer and a voltage transformer and determining a failure rate comprises determining the failure rate according to:

$$FR_{PASS}=FR_{CB,\ PASS}+FR_{DS,\ PASS}+FR_{GS,\ PASS}+FR_{B/CT/VT,\ PASS}$$

where $FR_{PASS}$ is the failure rate of the PASS module, $FR_{CB,\ PASS}$ is a failure rate of the circuit breaker of the PASS module, $FR_{DS,\ PASS}$ is a failure rate of the disconnector of the PASS module, $FR_{GS,\ PASS}$ is a failure rate of the grounding switch of the PASS module, and $FR_{B/CT/VT,\ PASS}$ is a failure rate of the bushing including a current transformer and a voltage transformer of the PASS module.

40. The computer-readable medium as recited in claim 37, wherein the integrated component is a Live Tank Breaker (LTB) Combined module comprising a circuit breaker, a digital optical current transformer, and a grounding switch and determining a failure rate comprises determining the failure rate according to:

$$FR_{LTB\ Combined}=FR_{CB,\ LTB\ Combined}+FR_{DOCT,\ LTB\ Combined}+FR_{GS,\ LTB\ Combined}$$

where $FR_{LTB\ Combined}$ is the failure rate of the LTB Combined module, $FR_{CB,\ LTB\ Combined}$ is a failure rate of the circuit breaker of the LTB Combined module, $FR_{DOCT,\ LTB\ Combined}$ is a failure rate of the digital optical current transformer of the LTB Combined module, and $FR_{GS,\ LTB\ Combined}$ is a failure rate of the grounding switch of the LTB Combined module.

41. The computer-readable medium as recited in claim 37, wherein the integrated component is an Air Insulated Switchgear (AIS) comprising a circuit breaker, a disconnector, a digital optical current transformer, a grounding switch, and a set of fixed contacts and determining a failure rate comprises determining the failure rate according to:

$$FR_{AIS,\ Module}=FR_{CB,\ AIS}+(0.9*FR_{DS,\ AIS})+FR_{DOCT,\ AIS}+FR_{GS,\ AIS}$$

and $$FR_{AIS,\ FC}=2*0.05FR_{DS,\ AIS}$$

where $FR_{AIS,\ Module}$ is the failure rate of the AIS module excluding the fixed contacts, $FR_{AIS,\ FC}$ is the failure rate of the fixed contacts of the AIS, $FR_{CB,\ AIS}$ is a failure rate of the circuit breaker of the AIS, $FR_{DS,\ AIS}$ is a failure rate of the disconnector of the AIS, $FR_{DOCT,\ AIS}$ is a failure rate of the digital optical current transformer of the AIS, and $FR_{GS,\ AIS}$ is a failure rate of the grounding switch of the AIS.

42. The computer-readable medium as recited in claim 37, further comprising:

retrieving at least one individual component failure time associated with an individual component of the integrated component; and determining a failure time of the integrated component based on the individual component failure time.

43. The computer-readable medium as recited in claim 42, wherein determining a failure time comprises setting the determined failure time to the failure time of a circuit breaker of the integrated component if a removable portion of the integrated component is faulted and setting the determined failure time to the failure time of a set of fixed contacts if the set of fixed contacts is faulted.

44. The computer-readable medium as recited in claim 42, wherein determining a failure time comprises setting the determined failure time to the failure time of a circuit breaker of the integrated component.

45. The computer-readable medium as recited in claim 42, further comprising:

retrieving at least one individual component maintenance frequency associated with an individual component of the integrated component; and determining a maintenance frequency of the integrated component based on the individual component maintenance frequency.

46. The computer-readable medium as recited in claim 45, wherein determining a maintenance frequency comprises setting the determined maintenance frequency to the maintenance frequency of a circuit breaker of the integrated component.

47. The computer-readable medium as recited in claim 45, further comprising:

retrieving at least one individual component maintenance time associated with individual components of the integrated component; and determining a maintenance time of the integrated component based on at least one individual component maintenance time.

48. The computer-readable medium as recited in claim 47, wherein determining a maintenance time comprises setting the determined maintenance time to the maintenance time of a circuit breaker of the integrated component.

49. The computer-readable medium as recited in claim 47, wherein determining a maintenance time further comprises setting maintenance times of other components of the integrated component to zero.

50. The computer-readable medium as recited in claim 47, further comprising:

retrieving information representative of interconnectivity of individual components of the power system; and retrieving information representative of which individual components are associated with an integrated component.

51. The computer-readable medium as recited in claim 50, further comprising:

determining a reliability assessment based on the interconnectivity information, the information representative of which individual components are associated with an integrated component, the determined maintenance frequency and time of integrated components of the power system, and the determined failure rate and time of the integrated components of the power system.

52. The computer-readable medium as recited in claim 37, further comprising:

receiving a selection of individual components from a user interface; and storing each selected individual component with a common identification that identifies each selected individual component as being part of the integrated component.

53. The computer-readable medium as recited in claim 52, further comprising:

selecting a unique identification number for the user-defined integrated component; and storing the unique identification number corresponding each selected individual component in a data store.

54. The computer-readable medium as recited in claim 53, further comprising:

receiving a name for the user-defined integrated component from a user interface; and storing the name corresponding user-defined integrated component in a data store associated with each selected individual component.

* * * * *